March 27, 1962  C. L. JOHNSON ET AL  3,026,773
ROCKET NOSE INSTALLATION
Filed Jan. 26, 1950  5 Sheets-Sheet 1
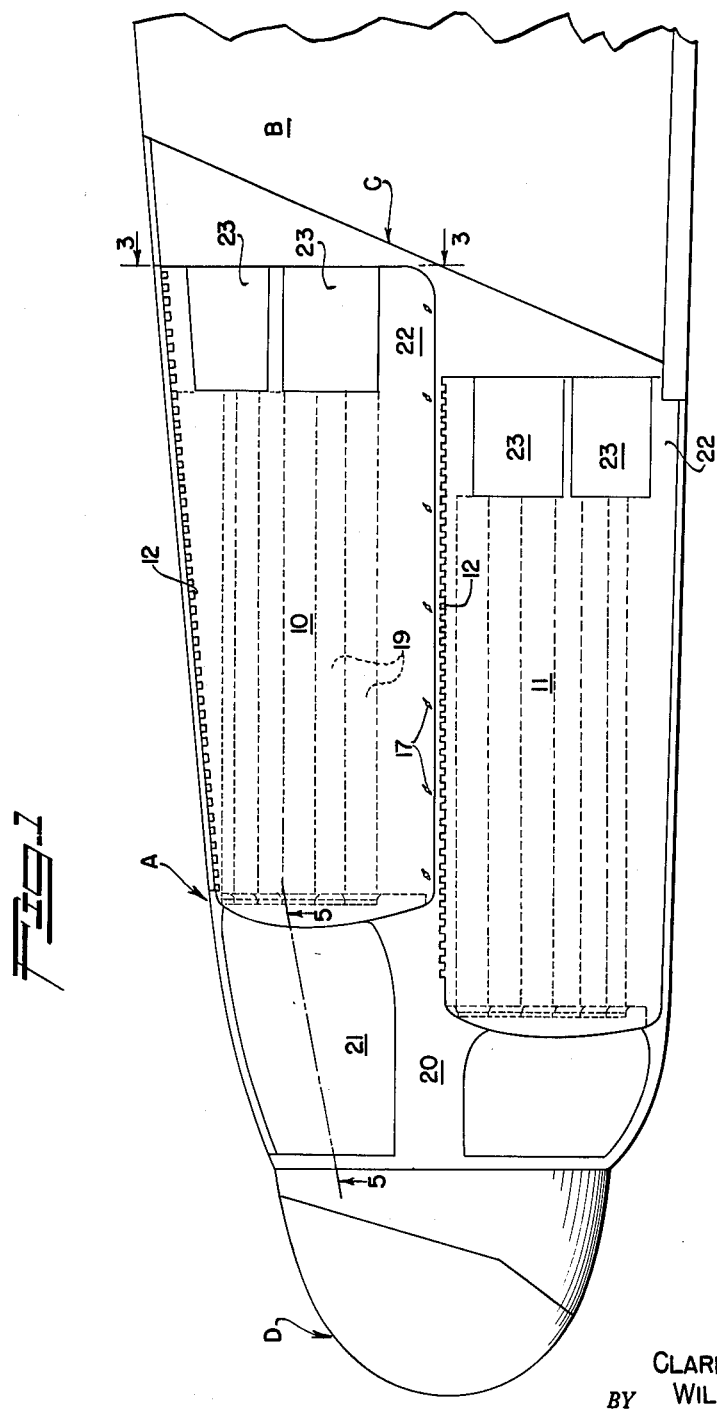
INVENTORS
CLARENCE L. JOHNSON
WILLIAM A. REED
BY
Agent March 27, 1962  C. L. JOHNSON ET AL  3,026,773
ROCKET NOSE INSTALLATION
Filed Jan. 26, 1950  5 Sheets-Sheet 2
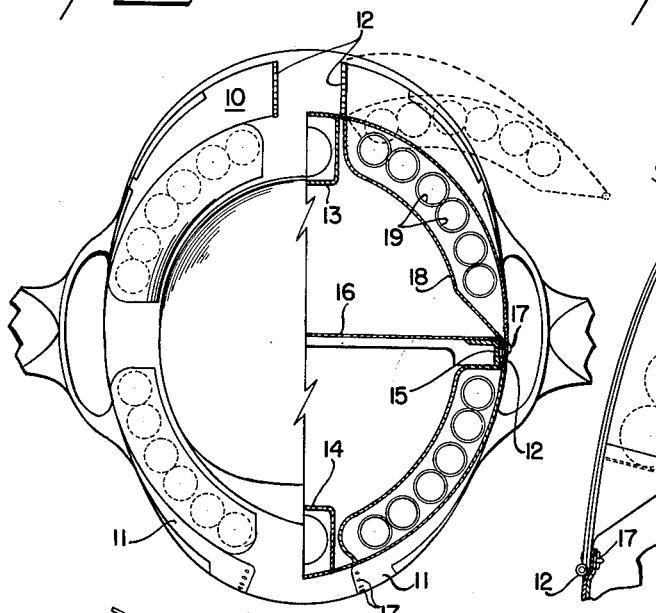
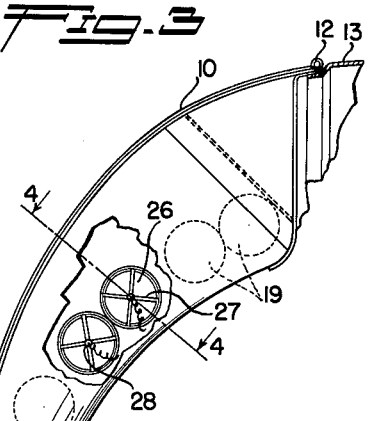
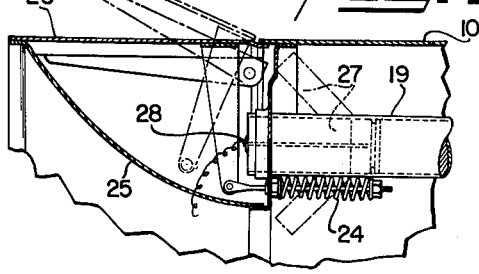
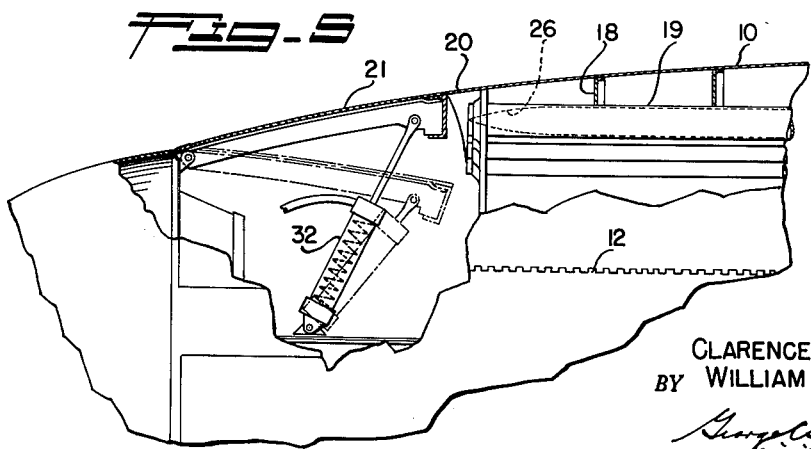
INVENTORS
CLARENCE L. JOHNSON
BY WILLIAM A. REED
Agent March 27, 1962  C. L. JOHNSON ET AL  3,026,773
ROCKET NOSE INSTALLATION
Filed Jan. 26, 1950  5 Sheets-Sheet 3
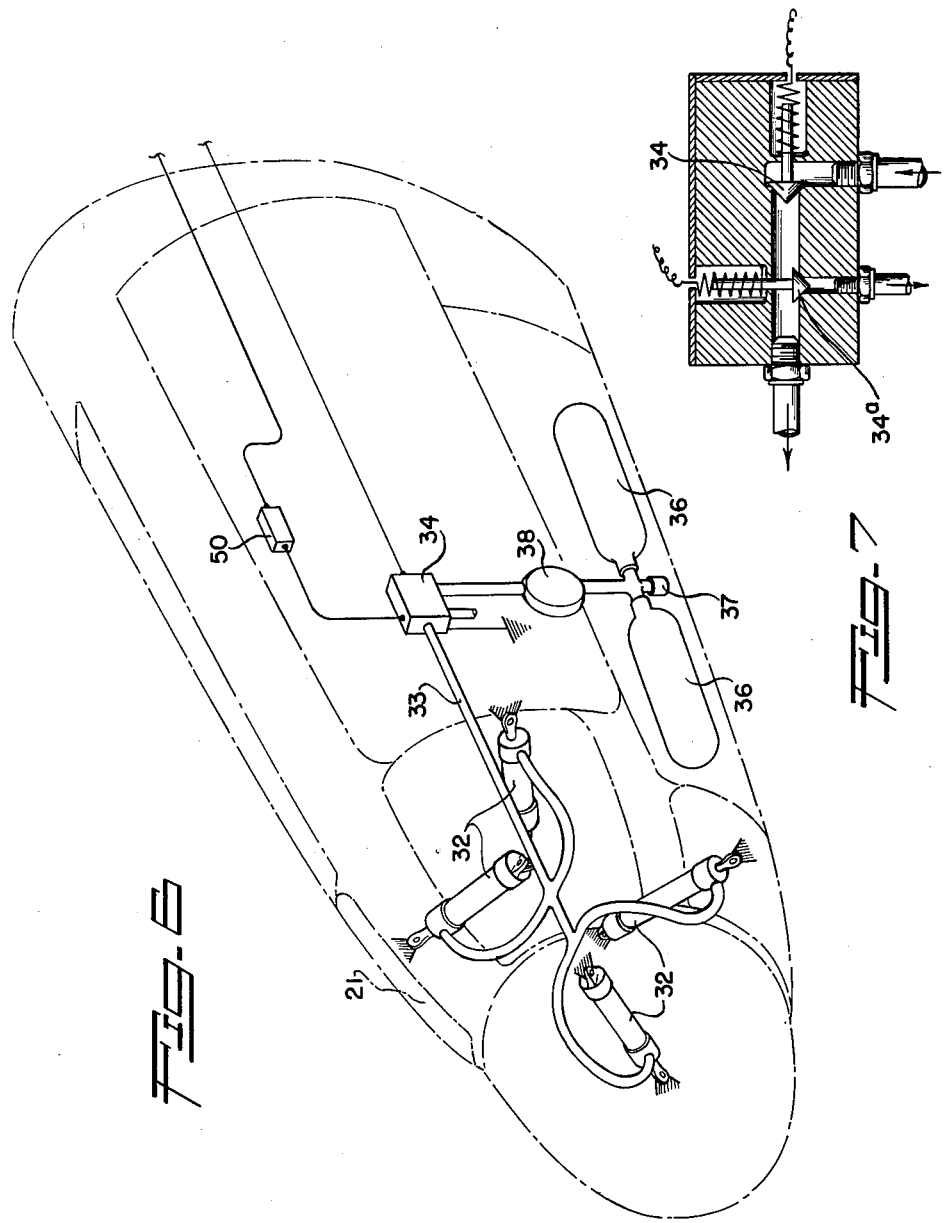
INVENTORS
CLARENCE L. JOHNSON
WILLIAM A. REED
BY
Agent

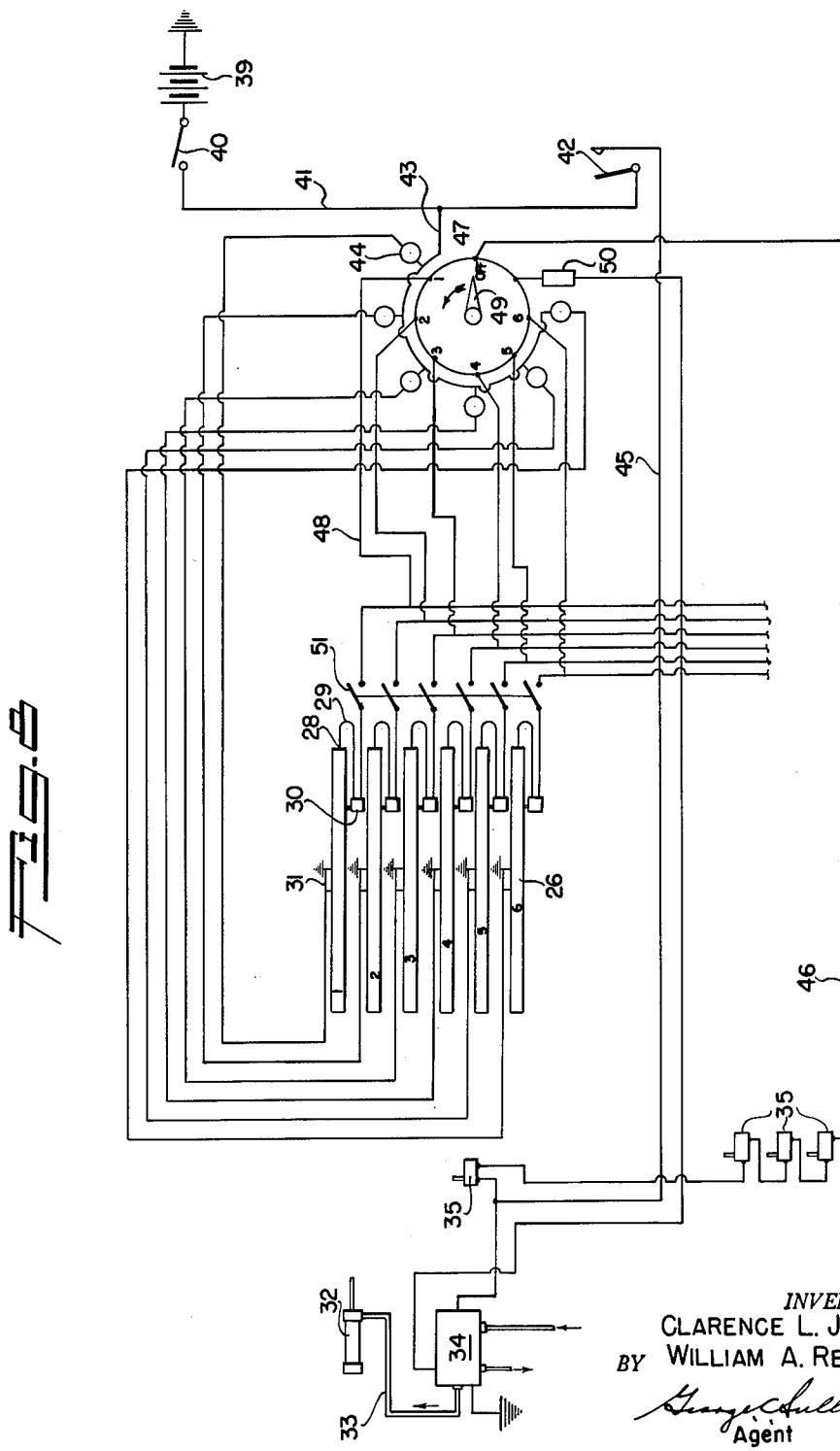

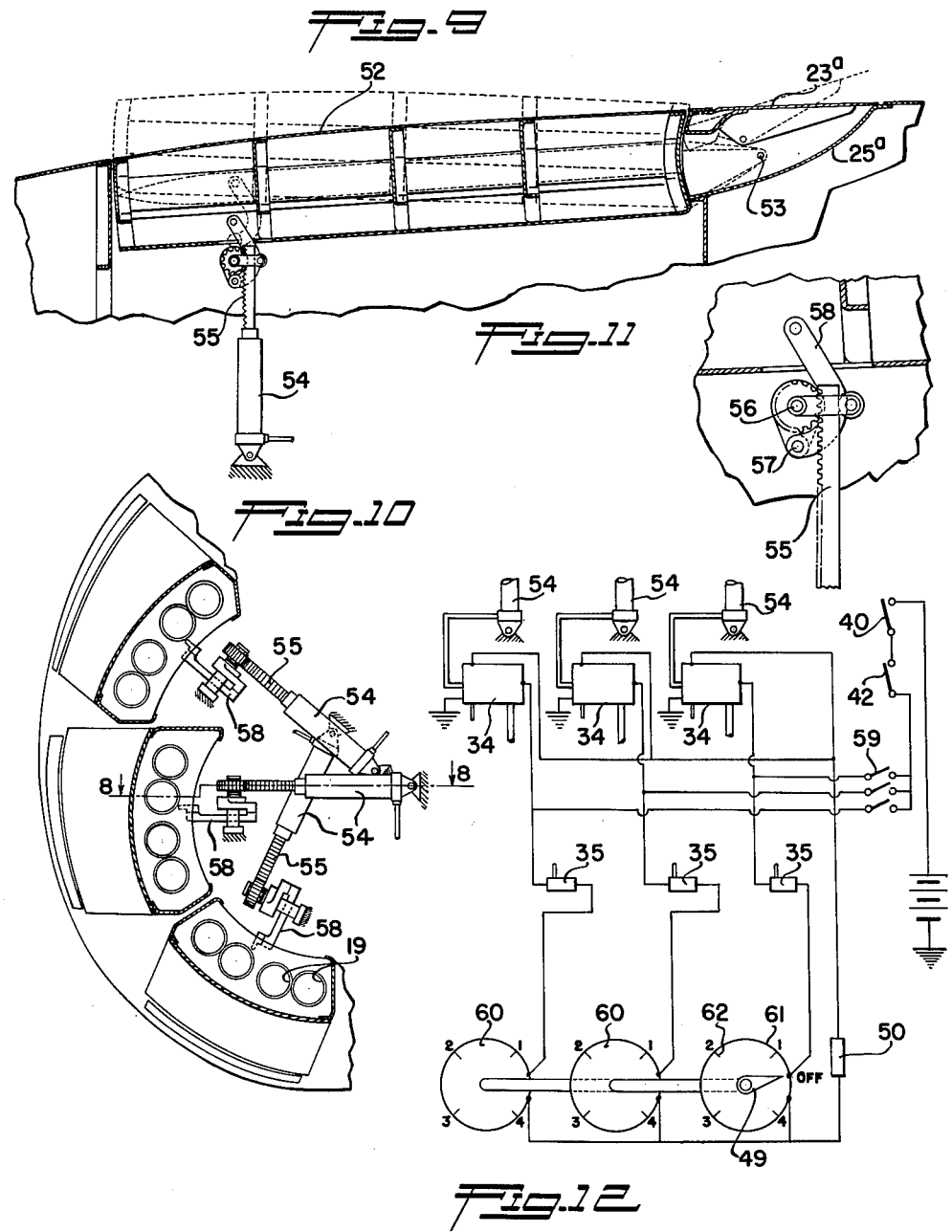

United States Patent Office 3,026,773
Patented Mar. 27, 1962

3,026,773
ROCKET NOSE INSTALLATION
Clarence L. Johnson, Encino, and William A. Reed, San Fernando, Calif., assignors to Lockheed Aircraft Corporation, Burbank, Calif.
Filed Jan. 26, 1950, Ser. No. 140,652
1 Claim. (Cl. 89—1.7)

This invention relates to novel and improved rocket launching arrangements especially adapted for installation in the nose of a streamlined body such as an airplane fuselage, nacelle or drop "tank," the rockets being carried in launching tubes normally within the streamline profile of the airplane, with the tube exits normally covered by fairing flaps; or temporarily extended beyond the adjacent skin envelope in an alternative version.

The effectiveness of a fighter or interceptor type of combat aircraft can be materially increased by the use use air-to-air rockets in place of a battery of machine guns. Larger types of rockets have heretofore been carried suspended on racks beneath the airplane wings, causing high drag because of the bulky installation; as with such types of rockets there is insufficient room for an adequate buried installation similar to that of machine guns, which latter would have the further disadvantage of long rocket ports that add considerable local drag to the basic streamline profile.

It is accordingly an object of this invention to provide a novel multiple rocket installation within the profile or skin line of an aircraft, or part thereof, such as a wing tank or nacelle, wherein the rockets are carried in tubes disposed around the interior periphery of the cross section of the airplane with rocket and gas exit arrangements normally fairing into the surrounding surface when closed.

It is also an object of this invention to provide a multiple rocket installation of the type described wherein the rockets are carried by access panels which, when open, provide ready access to the rockets and/or to the space available in the airplane interiorly thereof, which space is available for instrumentation, radio or radar equipment, and the like.

It is a further object of this invention to provide for synchronized and sequential operation of both the exit arrangements and the rocket firing whereby, if desired, the rockets may be fired in one or more volleys in automatic sequence. A preferred method of accomplishing this result is to provide a pneumatic operating mechanism for simultaneous opening of the rocket exits, which exits in turn energize an electric circuit, including an intervalometer, for sequencing the firing of the rockets.

Other objects and features of the invention will be readily understood from the following detailed description of typical preferred forms of the invention wherein reference will be made to the accompanying drawings in which:

FIGURE 1 is a side view of an airplane nose section incorporating one version of a rocket installation embodying the features of this invention;

FIGURE 2 is a front view thereof, partly broken away to show the rocket tubes arranged on the inner side of door panels, one of which is shown in dotted lines in its open position;

FIGURE 3 is an end view, taken on the line 3—3 of FIGURE 1;

FIGURE 4 is a section on the line 4—4 of FIGURE 3 showing a detail of one vent flap for releasing the rocket gases;

FIGURE 5 is a section on the line 5—5 of FIGURE 1 through one of the pneumatically operated rocket exit flaps, which flaps are opened prior to firing the rockets;

FIGURE 6 is a phantom outline perspective view showing the pneumatic exit flap operating mechanism;

FIGURE 7 is an enlarged schematic detail of the solenoid controlling the door flap operating mechanism;

FIGURE 8 is a wiring diagram of the timing and firing circuits, only the rockets in one door being shown;

FIGURE 9 is a side elevation of an alternative form of hinged panel rocket mounting wherein the panel opens outwardly into firing position;

FIGURE 10 is a front end view of a plurality of panels embodying the features of FIGURE 9;

FIGURE 11 is a detail of the panel operating mechanism of FIGURE 10; and

FIGURE 12 is a modified wiring diagram providing for single or multiple operation of a plurality of panels or doors.

As shown on the drawings:

The first illustrated embodiment of this invention is designed as a self-contained nose section A for an airplane fuselage B, being detachable at an inclined bulkhead C shown in FIGURE 1, and substantially interchangeable with other types of nose sections which adapt the basic airplane to other tactical missions. No details of the detachable feature are shown herein as the basic airplane is customarily built up of a number of subassemblies, the bulkhead C being one of the joint lines.

The forward end of the nose section A is formed as a radar dome D supported by upper and lower box beams 13 and 14, and the sides of the nose section to the rear thereof are largely occupied by doors 10 and 11 forming approximate quarter panels which are hinged at 12 to open out, the free sides of the upper doors being removably held closed against side members 15 of a horizontal central floor 16, as by quickly releasable screws 17. The upper pair of doors 10, which are hinged to the upper box beam 13, may be opened outwardly and upwardly, as indicated in dotted lines to the right of FIGURE 2; and the lower pair of doors, which are hinged adjacent to the floor side members 15, are opened outwardly from their closed position against the lower box beam 14.

Each of the doors 10 and 11 is provided with inner formers 18 supporting six rocket tubes 19 arranged parallel to the axis of the airplane and radially disposed to form a circumferential ring clearing the base diameter of the radar dome D. The nose section is tapered in elevation, as will be apparent from FIGURE 2, and from the junction of the front edges of the doors 10 to the base of the dome D the surface 20 is curved inwardly to meet the base of the dome; most of this curved surface being formed as inwardly opening rocket exit doors 21 which are hinged at their forward edges and are opened by mechanism, to be presently described, prior to actual ignition of the rockets.

The rear portions 22 of the doors 10 and 11 are each provided with two rocket exhaust flaps 23 which are normally held in a closed position by a spring 24 as indicated in FIGURE 4. An inner duct-like skin 25 on the doors 10 and 11 directs the rocket exhaust gases against the flaps 23 to open them as indicated by the dotted lines.

The rocket tubes 19 are designed to receive rockets 26, which are provided with folding tail fins 27 and an ignition plug 28. As indicated in FIGURE 7, each ignition plug 28 is wired at 29 in series with a rocket release solenoid 30 which latter normally keeps the rocket from shifting in the tube due to plane maneuvers; and a signal switch 31 is also provided, on the set of tubes in at least one of the doors, to indicate to the pilot that the tubes 19 are loaded with rockets.

Each of the four rocket exit doors 21 is opened by a pneumatic actuating cylinder 32, as indicated in dotted lines in FIGURE 5. The four cylinders 32 may be simultaneously operated by a pressure line 33 from a solenoid valve 34 and when fully open, each door closes a door limit switch 35 (FIGURE 7); which switches are wired in series, so that all four doors must be fully open before ignition of the rockets can occur. The operating fluid for the cylinders 32 may conveniently be a storage system utilizing high pressure air or gas bottles 36 located in the lower box beam 14, which are rechargeable through a filler connection 37, and feed to the solenoid valve 34 through a pressure reducing and/or regulating valve 38 (FIGURE 6). Pneumatic operation of the doors is preferred over equivalent hydraulic or electric flap actuation because of the increased speed of operation, which cuts down the time delay necessarily involved in opening the doors 21 before the rockets can be fired.

The solenoid valve includes, besides the pressure control valve 34 previously referred to, a second or vent valve 34ª which is energized through a time delay relay 50 to vent the cylinders 32 after the firing cycle is completed, to allow the rocket exit doors 21 to return to their faired position under the influence of a spring shown in dotted lines in FIGURE 5 inside the cylinders. The time delay relay is provided in case a rocket in the last round should "hang fire," and also provides sufficient time for ram air to scavenge the rocket exhaust from the tubes last fired.

The firing circuit for one of the doors 10 will now be described, having reference to FIGURE 8. A battery 39 feeds through an armament master switch 40, wire 41 leading to a firing switch 42. A branch line 43 from the wire 41 leads to indicator lights 44 which are separately lighted when the corresponding limit switches 31 are closed by rockets positioned in the respective tubes 19. A wire 45 from the firing switch 42 leads to the solenoid valve 34 which opens the pneumatic line 33 to the door operating cylinders 32. When each door fully opens it closes its limit switch 35. When all four doors have closed their door limit switches 35, a circuit is established through a wire 46 to an intervalometer 47, which sequentially energizes six successive circuits 48 each leading to rocket release solenoids 30 associated with a rocket tube in each door, the solenoids 30 in turn being connected to the ignition plug 28 in the rocket. The intervalometer is a standard timing mechanism identified as the A–3; and therefore will not be described in detail herein. The wiring for one door is shown in FIGURE 8 and that for the other three doors is the same with the possible exception of the limit switches 31 which may be omitted in the latter, if desired. Since the other three doors are wired in parallel with that shown, except for the door limit switches 35, all four of the latter are shown in the drawings.

In the operation of the foregoing described rocket firing controls I have chosen to illustrate a system providing for six separate or sequential volleys of four rockets each, as a volley of four simultaneously fired rockets tends to bracket the intended target, greatly increasing the probability of a hit. For economy in target practice, it might be preferable to fire single rockets; which can readily be accomplished either by loading only the one door 10 shown in the wiring diagram, or by inserting gang selector switches 51 in the wiring diagram from the intervalometer to permit selecting one or more rocket groups at a time.

When using the disclosed volley firing arrangement, one rocket comes out of each of the four doors at each firing impulse. The indicator lights 44 show the pilot which tubes 19 are loaded and which have been expended. Upon closing the armament master switch 40 the system is ready for firing by the trigger or firing switch 42, the master switch lighting the indicator lights corresponding to those tubes 19 which are loaded. Each light represents one group of four rockets and when one volley is fired the corresponding light goes out. The selector lever 49 on the intervalometer can be set to any of the loaded tubes for firing, so that if only one volley is to be fired the lever 49 is set at 1; No. 2 is used for 2, etc.

Once the armament master switch 40 has been closed and the intervalometer lever 49 set for the desired number of volleys, the pilot controls only the trigger switch 42. The trigger switch first energizes the door opening mechanisms for the four doors and the fully open doors then energize the actual firing circuit leading to the rocket release solenoid 30, and thence to the rocket igniter plug 28.

The rocket exit doors open in from one-tenth to one-quarter of a second and the ignition delay time in the rocket itself is approximately .03 second. When the intervalometer is used to fire more than one volley it may be pre-adjusted to fire at an interval such as one-tenth of a second, as combat conditions require. If the intervalometer has been set for more than one volley the trigger switch is used only once, and when the intervalometer reaches the off position the rocket exit doors close automatically after the time delay relay opens the vent valve 34ª. When firing single volleys the intervalometer is successively reset to the next group of rockets after it has completed its cycle for the preceding volley.

The alternative version of FIGURES 9 to 12 provides a plurality of panels 52 hinged at 53 at their rear ends so that the forward ends will pivot outwardly into the dotted line posiiton of FIGURE 9 so that rockets can be fired from tubes 19 mounted in the panels without requiring the use of the exit flaps or doors 21 previously described. The panels 52 may be operated by pneumatic cylinders 54, the stems of which are formed as gear racks 55 to rotate shafts 56 having cranks 57 operating bent levers 58 so arranged as to provide a positive mechanical inner position lock.

In connection with this embodiment of the invention, we have chosen to illustrate an operating arrangement wherein each panel 52 can be selectively or simultaneously opened. As shown in the diagram of FIGURE 12, this requires a separate solenoid valve 34 for each panel, with selective switches 59 for energizing each solenoid, which switches can be closed in any desired combination or sequence prior to the use of the firing switch 42. Also, either separate intervalometers 47 may be used for each panel, or a multiple or gang arrangement of switches 60 operated by a master intervalometer 61 is required, the latter being shown, wherein the rocket tubes 19 of each panel are connected to individual contacts 62 in groups which can be separately closed by the switches 60 if energized by the corresponding selector switches 59. With this arrangement, if firing singly, only one panel 52 would be opened while the rockets therein were being fired and the intervalometer would complete its operation and return to the starting or off position, whereupon the pilot could reset it and close another selector switch to prepare for firing the rockets in another panel 52. If all the selector switches were closed simultaneously, then operation of the firing circuit would open all the panels and sequentially fire volleys of rockets, as previously described in connection with the first form of our invention.

It will thus be seen that we have invented improved forms of rocket carrying and firing arrangements that are especially adapted for aircraft use of air-to-air rocket missiles; wherein the rockets are normally carried within the streamline envelope of the aircraft skin and are capable of being fired singly or in volleys at the will of the operator.

Having described only typical forms of the invention we do not wish to be limited to the specific details herein set forth, but wish to reserve to ourselves any variations or modifications that may appear to those skilled in the art and fall within the scope of the following claims.

We claim:

An apparatus for launching rockets from aircraft comprising a plurality of elongated panel-like access doors normally forming part of the envelope of a generally conical, forwardly tapering section of the aircraft, retractable means in the airplane envelope exposing the forward ends of said doors within the aircraft envelope at the forward ends thereof, a plurality of rocket launching tubes mounted on the interior surfaces of each of said doors, and rocket firing circuits closed upon the exposure of the forward ends of said doors.

References Cited in the file of this patent

UNITED STATES PATENTS

| | | |
|---|---|---|
| 2,261,121 | Martin | Nov. 4, 1941 |
| 2,391,864 | Chandler | Jan. 1, 1946 |
| 2,421,893 | Lambert et al. | June 10, 1947 |
| 2,445,235 | Meyers | July 13, 1948 |
| 2,451,745 | Jolly | Oct. 19, 1948 |
| 2,470,120 | Walker | May 17, 1949 |

FOREIGN PATENTS

| | | |
|---|---|---|
| 428,934 | Great Britain | May 15, 1935 |
| 832,464 | France | Sept. 28, 1938 |
| 411,576 | Italy | Jan. 18, 1945 |
| 585,564 | Great Britain | Feb. 11, 1947 |
| 924,013 | France | July 24, 1947 |

OTHER REFERENCES

Army Ordnance, July-August 1945 (page 91).